(12) United States Patent
Gottlieb

(10) Patent No.: US 7,579,395 B2
(45) Date of Patent: Aug. 25, 2009

(54) SELF-PATTERNING DECORATIVE COATING COMPOSITION AND METHOD FOR APPLYING THE COATING COMPOSITION

(75) Inventor: Richard A. Gottlieb, Weston, FL (US)

(73) Assignee: A.R.C. Materials, Inc., Weston, FL (US)

( * ) Notice: Subject to any disclaimer, the term of this patent is extended or adjusted under 35 U.S.C. 154(b) by 610 days.

(21) Appl. No.: 11/068,265

(22) Filed: Feb. 28, 2005

(65) Prior Publication Data

US 2006/0194907 A1 Aug. 31, 2006

(51) Int. Cl.
  C08L 83/08 (2006.01)
  C08L 83/04 (2006.01)
  C08K 5/103 (2006.01)
  D06M 15/643 (2006.01)
  B05D 1/34 (2006.01)
  B05D 5/06 (2006.01)

(52) U.S. Cl. .............. 524/317; 524/588; 524/612; 524/838; 524/869; 427/262; 427/263; 427/267; 427/268; 427/280; 427/281

(58) Field of Classification Search .......... 524/317, 524/588, 612, 838, 869; 427/402, 262, 263, 427/267, 268, 280, 281; 430/906
See application file for complete search history.

(56) References Cited

U.S. PATENT DOCUMENTS

| | | | |
|---|---|---|---|
| 2,768,093 A | 10/1956 | Ericks | |
| 3,635,858 A | 1/1972 | Shiratori | |
| 4,686,261 A | 8/1987 | Naito | |
| 4,719,034 A * | 1/1988 | Yamada et al. | 516/117 |
| 5,084,303 A | 1/1992 | Avera | |
| 5,122,395 A | 6/1992 | Sandor | |
| 5,348,766 A | 9/1994 | Latham | |
| 5,348,767 A | 9/1994 | Sandor | |
| 5,413,814 A | 5/1995 | Bowen et al. | |
| 5,536,769 A * | 7/1996 | Sandor | 524/388 |
| 5,639,513 A | 6/1997 | Latham | |
| 5,777,026 A * | 7/1998 | Berg et al. | 524/837 |
| 5,798,409 A * | 8/1998 | Ho | 524/506 |
| 5,807,921 A * | 9/1998 | Hill et al. | 524/837 |
| 6,656,975 B1 * | 12/2003 | Christiano et al. | 516/22 |
| 2003/0150358 A1* | 8/2003 | Liao et al. | 106/270 |
| 2006/0205861 A1* | 9/2006 | Gordon et al. | 524/506 |

* cited by examiner

*Primary Examiner*—Mark Eashoo
*Assistant Examiner*—Michael Pepitone
(74) *Attorney, Agent, or Firm*—Pablo Meles; Akerman Senterfitt

(57) ABSTRACT

A method is disclosed for creating an attractive and colorful decorative pattern or finish utilizing a water based polyurethane paint with specific chemical additives, and a removable taping system that prevents unsightly streaking when applying the coating on floors and walls. To achieve the effect of a colorful decorative pattern a water based acrylic pastel or white primer base coat is applied to a substrate by brush, roller, or spray-gun. A removable tape is applied to form barrier lines. A pigmented water based polyurethane dispersion containing specified additives is applied, thus chemically forming a pattern when applied. The tape is removed after the pigmented coating has dried, and a clear protective topcoat is applied over the patterned coating.

6 Claims, 1 Drawing Sheet

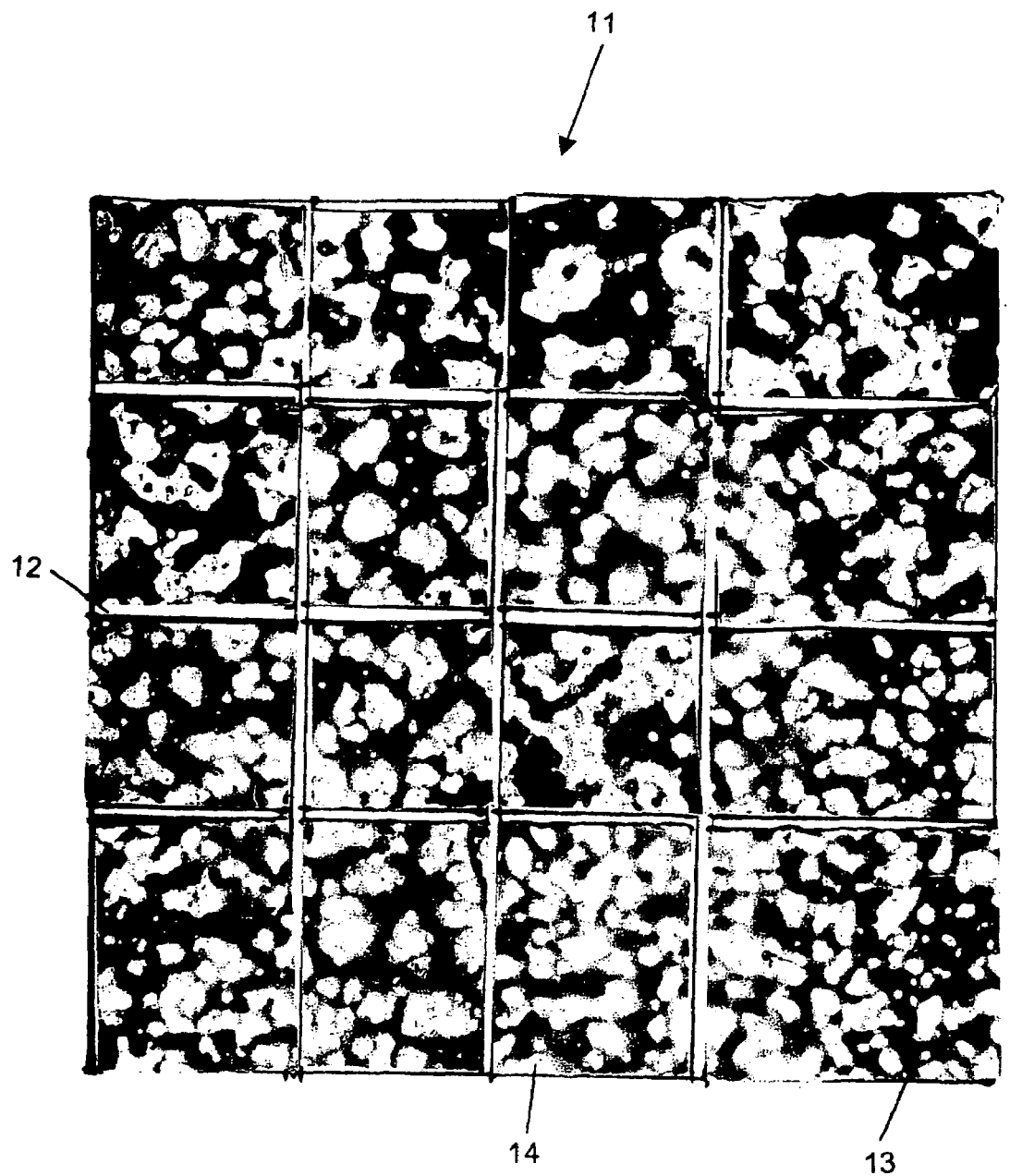

SELF-PATTERNING DECORATIVE COATING COMPOSITION AND METHOD FOR APPLYING THE COATING COMPOSITION

BACKGROUND OF THE INVENTION

Field of the Invention

The invention relates to a protective and decorative coating on the surface of a substrate, and in particular to a colored pattern coating whose application to a surface does not require additional tools to form a decorative pattern.

U.S. Pat. No. 2,768,093 to Ericks discloses coating a surface with a continuous base coating composed mainly of a pigmented resinous material dissolved in a hydrophobic organic solvent, and applying over the base coating while wet a composition containing relatively small discrete solid particles of cellulose material having a dimension between about 0.01 and 0.1 inch. The particles are coated with a solution of pigmented, resinous material immiscible in water and dispersed in a medium composed mainly of water.

U.S. Pat. No. 3,635,858 to Shiratori discloses a pattern paint which produces intermingled patterns which contain essentially of 35 to 40 weight percent of polyvinyl chloride or polyester resin, 12 to 18 weight percent of zinc stearate, and 42 to 53 weight percent in total of a mixed solvent formed of acetone, methyl ethyl ketone, methyl acetate, and xylene.

U.S. Pat. No. 4,686,261 to Naito discloses a process for producing a powdery paint additive by reacting: (a) a polymerized fatty acid polyamide resin formed by reaction of a polymerized fatty acid with a polyamide and soluble in an organic solvent, (b) a fluorine-containing copolymer having an active hydroxyl group in its molecular structure, an average molecular weight of 20,000 to 80,000, a fluorine content of 20 to 70 weight percent, and soluble in an organic solvent, and (c) a polyisocyanate which functions as a hardening agent for the resins (a) and (b) and which is soluble in an organic solvent, to thereby form a hardened reaction product. The reaction is carried out in an organic solvent inert to an isocyanate group, and the resulting product is pulverized.

U.S. Pat. No. 5,054,303 to Avera discloses producing faux finishes on non-porous surfaces by feeding a substrate through a coating apparatus at a substantially constant rate for coating the surface with at least one paint to provide a wet painted surface. Then a spattering is provided onto the wet painted surface of a non-uniform coating formed of a mixture of a protective coating and a solvent for the paint. The method further includes inducing some of the wet paint on the surface to flow randomly to create the faux pattern.

U.S. Pat. No. 5,122,395 to Sandor discloses the production of faux finishes by a two-step application of various aqueous mixtures.

U.S. Pat. No. 5,348,766 to Latham discloses a method for marbleizing an object by dipping the object into paint floating on borax-conditioned water. The invention requires that water must be conditioned with borax.

U.S. Pat. No. 5,348,767 to Sandor discloses production of faux effects using select color mixtures and blending solvents. The faux finishes is formed essentially of acrylic latex, propylene glycol, colorant and non-essential additives. The invention further applies random portions of a blending solvent mixture to the previous layer. The blending solvent mixture includes isopropyl alcohol, ethylene glycol monobutyl ether, water, and acrylic latex.

U.S. Pat. No. 5,413,814 to Bowen discloses techniques for coating articles to have the appearance of wood, leather, or other naturally occurring materials by forming a plurality of grooves on the surface of the article to provide a texture. A surfactant solution is applied on the surface so that the grooves have a greater amount of the surfactant solution than a remaining portion of the surface. Then at least one color solution is applied on the surface of the article so that the grooves have a greater amount of the mixture of the solution and color solution than the remaining portion of an article, and then saturating the surfactant solution, color solution and substrate color to achieve a desired concentration.

U.S. Pat. No. 5,639,513 to Latham discloses a method for marbleizing an object by dipping the object into paint floating on cream of tartar-conditioned water. The invention requires that water must be conditioned with cream of tartar.

None of the above discloses production of a patterned coating on a surface by applying a coating composition without requiring the use of special tools and treatments to pattern the coating after application.

SUMMARY OF THE INVENTION

It is accordingly an object of the invention to provide a method and a composition for the production of a patterned decorative coating on a surface of a substrate which overcomes the above-mentioned disadvantages of the heretofore-known methods and compositions of this general type and which, in particular allows one to produce a patterned decorative coating by applying a coating composition without requiring the use of special tools and treatments to pattern the coating after application.

With the foregoing and other objects in view there is provided, in accordance with the invention, a method for producing a decorative pattern of colors and/or textures on a substrate by applying to the substrate a novel color coating composition in which, contrary to conventional coatings, the colorants are selected so as to minimize hiding power, together with a selected primer and a selected topcoat. Certain accessory equipment particularly suitable for use in applying the indicated materials to a surface, in order to produce the desired decorative pattern according to the invention, can be included with the novel color coating composition, the primer, and the topcoat in a kit or system conveniently packaged together. The accessory equipment includes carefully selected rollers and masking tape.

Accordingly, the method of the invention is a method for creating a decorative pattern on a surface of a substrate, such as an architectural part, containing the steps of: providing a substrate having a surface, applying to the surface a water based pastel or white primer base coat, applying to the base coat a removable tape to form barrier lines, and applying a pigmented water based binder resin dispersion. The pigmented water based binder resin dispersion contains:

a) at least one pigment;
b) a binder resin being either a polyacrylate resin or a polyurethane resin;
c) a dispersant for the at least one binder resin;
d) a cationic aminofunctional silicone polymer; and
e) an emulsion containing silica, dimethylpolysiloxane, and at least one ester type nonionic surfactant.

This results in a chemically formed pattern. The tape is removed after the pigmented coating has dried, and a clear protective topcoat is applied over the patterned coating.

There is also provided, in accordance with the invention, a kit that includes at least the novel color coating composition, the primer, the topcoat, and selected application equipment as a packaged consumer product whose components cooperate to produce a new and useful effect in a particularly convenient manner for the retail vendor and the user, whether "do-it-yourself" or professional.

There is further provided, in accordance with the invention a substrate, such as an architectural part, having a patterned decorated surface with the color and/or texture effect produced on the surface by applying the novel composition.

There is moreover provided, in accordance with the invention the novel water based color coating composition as a new admixture containing essential ingredients that interact to produce a decorative pattern when applied on surfaces such as walls and floors instead of being a solid color like standard paints and coatings. The ingredients of the composition synergistically combine together to cooperate in forming unusual and attractive patterns when applied as colored coatings over white or pastel colored primers. The pattern coatings are coated again with a clear top coat, for example to prevent tire marks when used as garage coatings, and to help in maintaining their resistance to chemicals and stains. Accordingly, the ingredients of the composition are selected to afford the patterning effect according to the invention as well as good adhesion to the primer and to the topcoat.

In accordance with the invention, therefore, the novel composition contains water, at least one water-compatible polyurethane or polyacrylic resin, at least one cationic amine functional silicone polymer, at least one pigment, at least one poly(dimethylsiloxane)-treated silica and at least one [stearate] ester type non-ionic surfactant. Each of these ingredients is known in the art and commercially available in both 100% active and aqueous dispersion, emulsion, or solution forms for the formulator's convenience.

The backbone of the polyurethane binder resin is the polyurethane bridge resulting from the reaction of a plurality of isocyanate —N=C=O group containing molecules with a plurality of hydroxyl —OH group containing molecules. Typical isocyanate containing molecules are 2,4- and 2,6-toluene diisocyanates (TDI), frequently used in combination, and diphenylmethane 4,4'-diisocyanate (MDI), all classified as aromatic isocyanates; and hexamethylene 1,6-diisocyante and dicyclohexylmethane 4,4'-diisocyanate, usually classified as aliphatic isocyanates despite the alicyclic ring structure of dicyclohexylmethane 4,4,'-diisocyanate. Typical hydroxyl group containing molecules are hydroxyl-terminated polyesters resulting from the condensation reaction of dicarboxylic acids with glycols sometimes admixed with triols such as glycerol and trimethylolpropane, and hydroxyl-terminated polyethers such as polypropylene glycol ether oligomer. Hydroxyl group containing molecules suitable for polyurethane formation are available in a wide range of molecular weights from the simplest, ethylene glycol with molecular weight 62, to several thousands. Frequently, short chain and long chain hydroxyl group containing molecules are used together to tailor the physical and mechanical properties of the resulting polyurethane as desired. Accordingly, commercially available polyurethanes are conventionally classified as aromatic and "aliphatic" polyurethanes, as well as polyester and polyether polyurethanes according to the nature of the respective isocyanate and hydroxyl containing reactants.

Polyacrylic binder resins result from the vinyl type addition polymerization of esters of acrylic acid $CH_2=CHCOOH$ and methacrylic acid $CH_2=C(CH_3)COOH$ through the double bond. Esters of acrylic and methacrylic acids with alcohols having one to twelve carbon atoms are commercially available and frequently used in combinations of two or more esters to form copolymers and so make available a broad range of physical properties in the resulting resins.

A water-compatible polyurethane resin is stable in the presence of water at pH levels ranging from 5 to 9.

The water-compatible polyurethane resin as well as a water-compatible polyacrylic binder resin can be formulated to be emulsifiable in water or to dissolve in water or in a blend of water with a water-miscible organic solvent such as 2-propanol or 2-(2-butoxy)ethoxyethanol. Such emulsions and solutions can be stored without separation or loss in properties for up to six months at temperatures ranging from 4 to 38° C.

The amine functional polymer is a silicon compound having basic functions such as amino groups, in particular, an aminosiloxane. Chain-like dimethylsiloxanes having terminal aminopropyl units and 2 to 51, but preferably 2 to 12, silicon atoms per molecule have proven particularly useful. An illustrative chain-like dimethylsiloxane is shown below with its general structural formula.

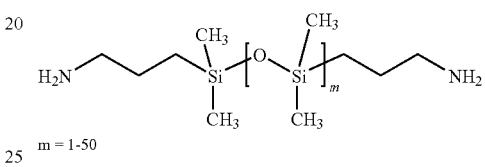

m = 1-50

Other amino-functional silicone polymers can be represented by the following general structural formulas:

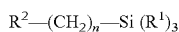

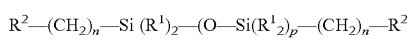

in which, independently at each occurrence,
p is an integer from 0 to 30,
n is an integer from 1 to 20,
$R^1$ is an alkyl group having 1 to 12 carbon atoms,
and $R^2$ is an amino group or a (2-aminoethyl)amino group.

Also suitable are amino functional silicone polymers with a terminal hydroxyl group disclosed by U.S. Pat. No. 4,247,592 to Kalinowski and amino functional silicone polymers disclosed by U.S. Pat. No. 4,661,577 to Kjohane. Each of these disclosures is herein incorporated by reference.

The amino functional silicone can be modified by admixture with a quaternary ammonium cationic agent, whereby a chemical interaction of the quaternary agent and the silicone is possible.

The pigment included in the coating according to this invention can be inorganic or organic. The pigment can also be white or any desired color.

Frequently a white pigment and a color pigment are used together.

Since great hiding power by pigments in the coating according to the invention is neither needed nor desired, there can be used low tinting strength pigments that would not be found in conventional coating compositions. There can also be used conventional high tinting strength pigments in lesser concentrations than usual. Given judicious dosing, therefore, any pigment can be used in the coating according to this invention.

Accordingly, suitable white pigments include barytes, chalk, lithopone, magnesium silicate, titanium dioxide, and zinc sulfide. Suitable color pigments include black, brown, red, and yellow grades of iron oxide; BON Red (an azo pigment); phthalocyanine blue and green. Where convenient aqueous dispersions of a desired pigment are not available, known methods can be used by those skilled in the art to pre-disperse dry pigment in water before combining with other ingredients of the coating according to the invention.

A particularly suitable surfactant composition for pre-dispersing pigments according to the invention contain dimethylpolysiloxanes CAS registry no. 63148-42-9 modified with silica and ester-type surfactants in a water emulsion. The silica ingredient can be suitably coated with hexamethyldisilazane. Suitable ester type surfactants include polyoxyethylene monostearate, sorbitan monostearate, Polysorbate 65 and Polysorbate 80.

A recipe according to the invention containing the aforementioned chemical additives is as follows:

| | |
|---|---|
| Resin or binder 30% solids water based aliphatic polyurethane dispersion | 50-70 PBW; |
| Nonionic water soluble polyurethane 50% | 7-7.5 PBW; |
| Nonionic polyurethane solution in a water and Butylglycol blend 50% solids | 3-3.5 PBW; |
| Tap water | 25-40 PBW; |
| Cationic amine functional silicone polymer in water emulsion | 20-40 PBW; |
| Aqueous organic pigment dispersion white | 5-7 PBW; |
| Aqueous organic pigment dispersion brown | 1-4 PBW; |
| Silicone emulsion mixture containing dimethyl Polysiloxanes treated silica and ester-type surfactants in a water emulsion mixture | 1-4 PBW; |

(PBW = parts by weight).

Other features which are considered as characteristic for the invention are set forth in the appended claims.

Although the invention is illustrated and described herein as embodied in a self-patterning decorative coating composition and a method of applying the coating composition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings and examples.

BRIEF DESCRIPTION OF THE DRAWING

The single FIGURE of the drawing is a photographic image of a surface such as the floor of a two-car garage to which a composition according to the invention has been applied over a white primer in a grid pattern, and allowed to dry.

DESCRIPTION OF THE PREFERRED EMBODIMENTS

Referring now to the single FIGURE of the drawing, there is shown a coated surface 11 divided into a grid pattern by tape strips 12, and characterized by darker areas 13 and lighter areas 14 formed in less than one minute as the coating composition formulated with a white pigment and a color pigment as in Example 1 was rolled on the surface and allowed to dry.

To obtain results such as those shown, there can be used one gallon of primer, one gallon of coating composition according to the invention, and where pertinent one gallon of clear topcoat to cover approximately 400 square feet of surface, or the floor area of a typical two car garage in the United States.

The decorated surface according to the invention can be curved or planar, preferably planar. The substrate having a decorated surface according to the invention can be any convenient architectural part such as a wall, floor, roof, joist, support, appliance, or furniture item without limitation.

The substrate surface can be made of any convenient material, including concrete, glass, gypsum board, metal, plastic, rubber, wood, and combinations thereof. Typical combinations include unsaturated polyester resins reinforced with glass fibers and rigid polyvinyl chloride compounded with wood flour.

EXAMPLE 1

A substrate panel of dry-wall (gypsum board) was provided with a coat of commercially available white acrylic primer and allowed to dry. The panel was then coated in sequence with the following composition:

| Ingredient | Parts by weight actual | Parts by weight dry basis |
|---|---|---|
| Aliphatic polyurethane-polyacrylate dispersion | 60 | 18 |
| Nonionic water-soluble Polyurethane | 7 | 3.5 |
| Nonionic polyurethane Solution in water and 2-butoxyethanol | 3 | 1.5 |
| Aminofunctional silicone Polymer (blend of amino--ethylaminopropylpolysiloxane CAS reg no 68554-54-1 and Quaternary ammonium agent CAS Reg no 61791-10-4) | 30 | 15 |
| White pigment dispersion | 6 | 2 |
| Brown pigment dispersion | 3 | 1 |
| Silicone 10% antifoam Emulsion (blend of water, dimethylpoly-siloxane, sorbitan monostearate, polyoxyethylene monostearate, and hexamethyldisilazane treated silica) | 2 | 0.2 |

All the above ingredients are mixed together in a typical paint mixing vessel until a homogeneous and smooth liquid of one color is visible to the naked eye. This then becomes the color coat which is the object of the invention.

In preparation for using the color coat the following procedure was used.

First, a surface such as a floor is prepared to be free of any contaminants that would affect the appearance of the final coating. This could consist of acid washing of the floor, drying the floor and cleaning the floor with conventional cleaning equipment and chemical detergents. If used on walls, the surface should be cleaned with conventional cleaning detergents and then dried.

Then the floor or wall is coated with a conventional acrylic primer having good adhesion to the surface on which it is applied, and also having good co-adhesion to the instant color coat.

Then it is necessary to use an easy releasable tape (masking tape) to form a checkerboard effect. The squares formed can vary from 2 ft×2 ft to 5 ft×5 ft, depending on the size of the area to be coated. The tape is applied only after the primer coat is completely dried. The tape used can vary from 1" to 2" in width.

The color coat is remixed so that only one color is visible and it is applied with a ⅜" knap roller to the floor or wall surface. It is applied in a fashion so that the applicator stops rolling when he or she reaches the checkerboard tape. Note: as long as there is liquid on the roller the applicator can continue rolling on another square, but the rolling must be stopped when the tape of the square being coated is reached.

When there is no more liquid on the roller the applicator should wait a few minutes and see the results of the pattern he has created with the color coat. If it is pleasing to the eye then the applicator adds additional colorcoat liquid to the roller and begins coating additional squares in the same manner that he did at the beginning of the color coating cycle. If it is not pleasing and needs repair the applicator takes the dry roller and rerolls over the color coat very lightly in the opposite direction of when he applied the color coat, (first vertical then wait several minutes and then horizontal) this should then even out the pattern to be pleasing to the applicator. If, however the applicator is still not satisfied with appearance of the pattern he or she can smooth out the pattern by rerolling over the areas that the applicator found not pleasing to the eye. This then gives a very attractive pattern or decorative appearance like terrazzo or marble to the surface that has been coated and is the essence of using the coating of the invention to form pleasing patterns over white or pastel primed surfaces. The invention includes the use of the easy releasable tape to eliminate streaking or lap marks that are caused when the applicator continues rolling the color coat with a dry roller.

The final step to the invention is to apply a clear topcoat of either an acrylic emulsion with good tire and chemical and cleaner resistance, or a clear topcoat of a blend of acrylics and water based polyurethane resins that has good tire mark resistance and good chemical and cleaner resistance.

Although the chemical ingredients used in this invention are known to the paint and coating industry, they have never been used together to form a synergistic mixture that forms a pleasing pattern when combined with aqueous color dispersions over a colored prime coat. Very small amounts of the aqueous color dispersions are used in place of the heavy conventional color dispersions used by the paint and coating industry.

I claim:
1. A coating composition, comprising:
   water in an amount of 25 to 40 parts by weight;
   at least one low tinting pigment, wherein the low tinting pigment is selected to minimize hiding power in an amount of 1 to 7 parts by weight;
   at least one binder resin selected from the group consisting of polyacrylate resins and polyurethane resins in an amount of 50 to 70 parts by weight;
   a dispersant for the at least one binder resin;
   a cationic aminofunctional silicone polymer in amount 20-40 parts by weight; and
   an emulsion containing silica, dimethylpolysiloxane, and at least one ester type nonionic surfactant in amount of 1-4 parts by weight;
   the coating composition having a specific ratio range of said cationic aminofunctional silicone polymer to said emulsion, becoming a self patterned decorative coating when applied to a surface of a colored substrate without requiring the use of special tools and treatments to pattern the patterned decorative coating after application to the colored substrate.
2. The composition according to claim 1, wherein said at least one binder resin is an aliphatic polyurethane.
3. The composition according to claim 1, wherein said cationic aminofunctional silicone polymer is an aminoethylaminopropylpolysiloxane.
4. The composition according to claim 1, wherein said ester type nonionic surfactant is selected from the group consisting of glycerol monosterate, sorbitan monostearate, and polyoxyethylene monostearate.
5. The coating composition of claim 1, wherein the self patterned decorative coating forms in the coating area in a pattern appearing in a terrazzo pattern or a marble pattern.
6. The coating composition of claim 1, wherein the self patterned decorative coating forms a decorative pattern within the coating area itself.

* * * * *